United States Patent
Garg et al.

(10) Patent No.: US 9,923,764 B2
(45) Date of Patent: Mar. 20, 2018

(54) HEALTHCHECK ACCESS POINT

(71) Applicant: Parallel Wireless, Inc., Nashua, NH (US)

(72) Inventors: Sumit Garg, Hudson, NH (US); Steven Beaudette, Nashua, NH (US); Rajesh Kumar Mishra, Westford, MA (US); Kaitki Agarwal, Westford, MA (US)

(73) Assignee: Parallel Wireless, Inc., Nashua, NH (US)

( * ) Notice: Subject to any disclaimer, the term of this patent is extended or adjusted under 35 U.S.C. 154(b) by 0 days.

(21) Appl. No.: 14/946,129

(22) Filed: Nov. 19, 2015

(65) Prior Publication Data

US 2016/0142252 A1 May 19, 2016

Related U.S. Application Data

(60) Provisional application No. 62/081,930, filed on Nov. 19, 2014.

(51) Int. Cl.
| | |
|---|---|
| *H04W 24/00* | (2009.01) |
| *H04L 12/24* | (2006.01) |
| *H04W 12/08* | (2009.01) |
| *H04W 76/02* | (2009.01) |
| *H04L 12/26* | (2006.01) |
| *H04W 84/18* | (2009.01) |
| *H04W 12/04* | (2009.01) |
| *H04W 88/06* | (2009.01) |
| *H04L 29/06* | (2006.01) |
| *H04W 84/12* | (2009.01) |

(52) U.S. Cl.
CPC .......... *H04L 41/0806* (2013.01); *H04L 43/50* (2013.01); *H04W 12/08* (2013.01); *H04W 76/021* (2013.01); *H04L 63/101* (2013.01); *H04W 12/04* (2013.01); *H04W 84/12* (2013.01); *H04W 84/18* (2013.01); *H04W 88/06* (2013.01)

(58) Field of Classification Search
CPC ..... H04W 12/12; H04W 12/06; H04W 8/245; H04W 88/08; H04W 80/04; H04W 84/12; H04L 2012/5607
USPC ........ 455/410–411, 418–420, 423–425, 561; 370/310.2, 328, 338
See application file for complete search history.

(56) References Cited

U.S. PATENT DOCUMENTS 7,263,076 B1 * 8/2007 Leibovitz ................ H04L 63/10
370/310
7,346,338 B1 * 3/2008 Calhoun ............. H04L 63/1408
455/410

(Continued)

FOREIGN PATENT DOCUMENTS

| CN | 1014899222 A | 7/2009 |
|---|---|---|
| WO | 2014123576 A1 | 8/2014 |

*Primary Examiner* — Steve D Agosta
(74) *Attorney, Agent, or Firm* — Michael Y. Saji (57) ABSTRACT

A wireless configuration network may be provided by a Wi-Fi hotspot active at the wireless access station. The Wi-Fi hotspot may be connected to by a wireless network-capable device, such as a tablet computer, e.g., an Apple iPad, or a Wi-Fi enabled smartphone, e.g., an Android or Apple iOS device. This allows a technician to stand on the ground below the wireless access station but still have access to various configuration features of the wireless access station. The wireless configuration network may also be referred to herein as a "debug SSID" or a "debug access point."

4 Claims, 6 Drawing Sheets

AP Mode

(56) References Cited

U.S. PATENT DOCUMENTS

| | | | | |
|---|---|---|---|---|
| 7,567,805 B2* | 7/2009 | Cox | ............... | H04L 41/0806 |
| | | | | 370/252 |
| 8,380,207 B2* | 2/2013 | Tong | ............ | H04W 36/0022 |
| | | | | 370/338 |
| 8,555,054 B2* | 10/2013 | Kuo | ............... | G06F 21/57 |
| | | | | 713/156 |
| 8,830,971 B1 | 9/2014 | Shipley et al. | | |
| 2004/0127204 A1* | 7/2004 | Belmont | ......... | H04W 48/18 |
| | | | | 455/418 |
| 2005/0047326 A1* | 3/2005 | Puon | ............... | H04L 41/082 |
| | | | | 370/216 |
| 2005/0185626 A1* | 8/2005 | Meier | ............ | H04L 12/4641 |
| | | | | 370/338 |
| 2007/0254614 A1* | 11/2007 | Muralidharan | ..... | H04W 12/04 |
| | | | | 455/307 |
| 2008/0167003 A1* | 7/2008 | Wang | ............... | H04W 8/20 |
| | | | | 455/411 |
| 2008/0198826 A1* | 8/2008 | Won | ............... | H04W 24/02 |
| | | | | 370/338 |
| 2010/0142403 A1* | 6/2010 | Baumgarth | ..... | H04L 41/0806 |
| | | | | 370/254 |
| 2011/0004747 A1* | 1/2011 | Venkatachalam | ..... | H04L 12/66 |
| | | | | 713/2 |
| 2012/0106468 A1* | 5/2012 | Engstrom | ..... | H04L 29/12669 |
| | | | | 370/329 |
| 2013/0329583 A1* | 12/2013 | Vrzic | ............... | H04W 36/30 |
| | | | | 370/252 |

* cited by examiner

HEALTHCHECK ACCESS POINT

CROSS-REFERENCE TO RELATED APPLICATIONS

This application claims the benefit of priority under 35 U.S.C. § 119(e) of U.S. Provisional Patent Application No. 62/081,930, filed Nov. 19, 2014, and entitled "HealthCheck Access Point," which is hereby incorporated by reference in its entirety for all purposes. In addition, U.S. patent application Ser. Nos. 13/889,631; 14/211,355; 14/146,857; 14/183,176; 14/777,246; 14/453,365; and 14/454,670 are hereby incorporated by reference herein in their entirety for all purposes.

BACKGROUND

A wireless access station may be remotely configurable, for example, via a cloud configuration server. However, when a wireless access station is unpacked from the box and is being initially configured, various configuration steps may require physical access to the wireless access station but may also require the wireless access station to be placed atop a radio tower at the same time. This may require a technician to climb the radio tower to configure the wireless access station.

As well, during normal operation, the wireless access station functions like a part of a larger cloud network, with all control, operational and debug data being accessed from there. There is no need for any other form of access to the radio access network (RAN). However, for an isolated mesh node which loses its backhaul or even fails to establish a backhaul connection towards the cloud, a way to fix the issue or capture operational data without having to physically connect to the node is desirable.

SUMMARY

It is desirable to provide a wireless network for initial configuration that does not require the installer to be physically connected via a cable or to be physically located atop the radio tower with the wireless access station. This document describes the requirements for such an access method using Wi-Fi.

In the present disclosure, a wireless access station may be an eNodeB for LTE, a Wi-Fi base station, a mesh network node, or another type of device that provides access and/or backhaul for a voice and/or data network. A wireless access station provides a radio access network, or RAN.

In one embodiment, a wireless configuration network is provided by a Wi-Fi hotspot active at the wireless access station. The Wi-Fi hotspot may be connected to by a wireless network-capable device, such as a tablet computer, e.g., an Apple iPad, or a Wi-Fi enabled smartphone, e.g., an Android or Apple iOS device. This allows a technician to stand on the ground below the wireless access station but still have access to various configuration features of the wireless access station. The wireless configuration network may also be referred to herein as a "debug SSID" or a "debug access point."

Accordingly, systems and methods for providing a wireless configuration network are disclosed.

In a first embodiment, a wireless access station is disclosed, comprising: a configuration module for configuring the wireless access station; a configuration wireless access network module for providing wireless access to the configuration module; and a configuration wireless access security module for providing security information to the configuration wireless access network module, performing a handshake with a configuration server, and synchronizing the security information with the configuration server.

The wireless access station may be a multi-radio access technology (multi-RAT) wireless access station supporting Long Term Evolution (LTE) and Wi-Fi wireless access technologies. A mesh network module may be provided for providing mesh backhaul to the wireless access station. The configuration wireless access security module may be configured to provide access to a mobile device with a current version of the security information when the wireless access station does not have a backhaul connection to a core network. The configuration module may be configured to provide health monitoring, connectivity checking, hardware status monitoring, network status monitoring, load monitoring, or other status monitoring at the wireless access station. The security information may be a Wi-Fi pre-shared key (PSK).

In a second embodiment, a method for providing configuration access to a base station is disclosed, comprising: reading configuration information for a configuration wireless network at a base station, the configuration information including a known Wi-Fi service set identifier (SSID); initializing the configuration wireless network at the base station using the known Wi-Fi SSID in access point mode; synchronizing the configuration information with a server; and enabling a mobile device to connect to the configuration wireless network, the mobile device using the configuration information received from the server.

The method may further comprise providing access to a mobile device with a current version of the configuration information when the base station does not have a backhaul connection to a core network. The method may further comprise requiring additional security credentials after the mobile device connects to the configuration wireless network. The configuration information may include a Wi-Fi pre-shared key (PSK). The method may further comprise providing health monitoring, connectivity checking, hardware status monitoring, network status monitoring, load monitoring, or other status monitoring at the base station. The method may further comprise whitelisting certain devices for enabling the mobile device to connect to the configuration wireless network, the whitelisting using an identifier from the mobile device, the identifier being at least one of international mobile subscriber identity (IMSI), international mobile equipment identity (IMEI), medium access control (MAC) address, mobile subscription identification number (MSIN), globally unique temporary user equipment identity (GUTI), device serial number, and device configuration number.

In a third embodiment, a method for providing configuration access to a base station is disclosed, comprising: reading configuration information for a configuration wireless network at a base station, the configuration information including a known Wi-Fi service set identifier (SSID); synchronizing the configuration information with a coordination server; periodically scanning for the known Wi-Fi SSID in station mode; and connecting to the known Wi-Fi SSID generated by another device, the another device receiving the known Wi-Fi SSID from the coordination server.

The method may further comprise providing access to a mobile device with a current version of the configuration information when the base station does not have a backhaul connection to a core network. The method may further comprise requiring additional security credentials after the mobile device connects to the configuration wireless network. The configuration information may include a Wi-Fi pre-shared key (PSK). The method may further comprise providing health monitoring, connectivity checking, hardware status monitoring, network status monitoring, load monitoring, or other status monitoring at the base station. The method may further comprise whitelisting certain devices for enabling the mobile device to connect to the configuration wireless network, the whitelisting using an identifier from the mobile device, the identifier being at least one of international mobile subscriber identity (IMSI), international mobile equipment identity (IMEI), medium access control (MAC) address, mobile subscription identification number (MSIN), globally unique temporary user equipment identity (GUTI), device serial number, and device configuration number.

DETAILED DESCRIPTION

A wireless access station could be functioning in either one of 2 possible modes of operation: gateway mode and mesh mode. A gateway mode has access to an inter-connect network though which it establishes connectivity to the cloud. The inter-connection could either be wired or wireless (e.g. Long Term Evolution, or LTE). In mesh mode, the wireless access station has no direct connection to the core or infrastructure provider network. Its only means of connecting to the network is over mesh-links. Establishment of the mesh network is covered in other applications, such as U.S. patent application Ser. No. 14/146,857, hereby incorporated in its entirety.

Scenarios

Figure 1:
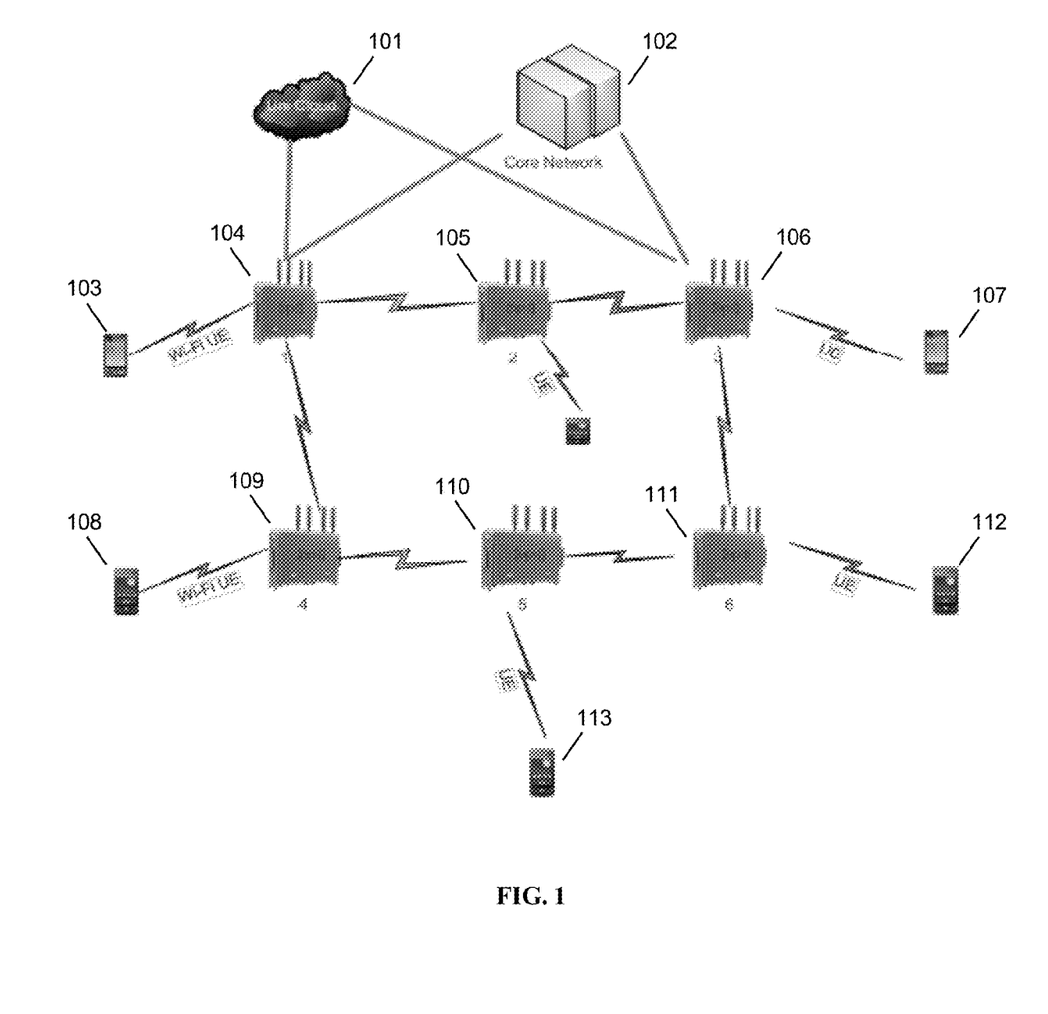
FIG. 1 depicts a deployment scenario for a wireless access station in an operator network, in accordance with some embodiments.

FIG. 1 depicts a typical deployment scenario for a wireless access station in an operator network. A wireless access station could be functioning in either one of two possible modes of operation: gateway mode and mesh mode. A gateway mode has access to an inter-connect network though which it establishes connectivity to the cloud. The inter-connection could either be wired or wireless (e.g. LTE). In mesh mode, the wireless access station has no direct connection to the core or infrastructure provider network. Its only means of connecting to the network is over mesh-links. Establishment of the mesh network is covered in other applications, such as U.S. patent application Ser. No. 14/146,857, hereby incorporated in its entirety.

As well, there are scenarios where a more elaborate access mechanism is desirable:

Green-field install (e.g., installation in remote area without supporting infrastructure): Feedback from the wireless access station is desirable for the best alignment of directional antennas, and general health check.

Isolated Node: In the case of an isolated mesh node which loses its backhaul or fails to establish a backhaul connection to the cloud, there needs to be a way to fix the issue or at least capture operational data without having to physically connect to it.

Initial deployments: For a period after a wireless access station is initially deployed, periodic health monitoring may be desirable even though cloud connectivity is established.

Health monitoring, or health checking, may include at least one of: connectivity checking; hardware status monitoring; network status monitoring; load monitoring; or other status monitoring.

Any radio band or radio access technology or protocol may be used. If Wi-Fi is used, a built-in access radio can be used to provide this functionality, in some embodiments.

Station Mode and Access Point Mode

In some embodiments, a Wi-Fi hotspot may be created for the wireless configuration network. The hotspot may be created at the wireless access station, with the wireless access station running in an access point (AP) mode. To run in this mode, a network name or service set identifier (SSID) must be assigned to the network. Although the SSID need not be broadcast, the wireless access network may allow any node to join that has knowledge of the SSID. This may have a negative impact on security.

In some embodiments, a wireless access station may instead scan for a wireless network with a given SSID, without itself creating the network, thus remaining in STA (station) mode and not in AP mode. This allows the wireless access station to more carefully control security on the wireless configuration network.

In some embodiments, the wireless configuration network is only available when no connectivity to the rest of the Internet is available; in other embodiments, the wireless configuration network is always available, regardless of the connectivity available to the wireless access station. In some embodiments, the wireless access station may automatically turn the wireless configuration network on and off, based on, for example, failure states at the wireless access station. In this case the solution could be run as a part of the wireless access station application software.

The station mode may be identified herein as the DebugSSID process or the DebugSTA process. The access point mode may be identified herein as the DebugAP process.

Both modes are described in greater detail below.

Access Point Mode

In some embodiments, the wireless access station may create a Wi-Fi network in AP mode and may permit access to itself. In some embodiments, the SSID may be broadcast.

In some embodiments, the feature is always on. In some embodiments, the feature assumes a dual-band access radio, and the wireless configuration network is launched by default on channel-1 in 802.11g mode. In some embodiments, WPA-PSK level security is provided. In some embodiments, the SSID broadcast would be of the form "<wireless access station>-<wireless access stationId>." In some embodiments, security is provided that limits connected devices according to an identifier whitelist, including one or more of: IMSI; IMEI; MAC address; MSIN; GUTI; device serial number; device configuration profile; or another identifier.

In some embodiments, when an always-active mode is used, the STA does not need to know the frequency of operation beforehand, as the STA may discover it.

As an AP the wireless configuration network may broadcast its SSID, so its presence may be known, in some embodiments. In some embodiments, the SSID can be hidden, or in stealth mode, and the wireless configuration network can be made to not answer wild-card probe requests, in some embodiments.

In some embodiments, a new task or process called debugAP may be created. This task will be decoupled from the wireless access station application for resilience and simplicity.

A platform manager module may launch debugAP before launching wireless access station application software. The Debug AP task may: a.) get one or more of the following information from the PlatformMgr and initialization file: wireless access station-Id, PSK information, Wi-Fi Access Interface (Default is P3); b.) look for a band-freq.cfg file in the obtained configuration files to retrieve the Band and frequency to be used for the debugAP. If not found, it will assume a 2.4 GHz band with 2412 Mhz (channel 1) in g-mode. c.) based on the above, it will create a config file for hostapd/ d.) launch the hostapd. e.) It will periodically monitor the band-freq.cfg file for updates and if it finds a change, it will relaunch/SIGHUP the hostapd application.

In some embodiments, an application for the wireless access station called WiFiMgr may be used. Based on the radio configuration received from the cloud the WiFiMgr would update/create the band-freq.cfg file. Other changes would be to disable polling for the debugSTA mode and to use/create only 3 virtual APs for normal use.

No special changes are required in the wireless access station host access point ('hostap') to provide access to one or more mobile devices while concurrently providing this feature.

In some embodiments, reboot on core dump may be delayed if another device is attached to the wireless access station.

In some embodiments, a Wi-Fi pre-shared key (PSK) may be randomly auto-generated to provide additional security. One mechanism for generating the PSK is as follows. The PSK is generated at a central cloud server. The central cloud server may use entropy to randomly generate a key, for example, a 32-byte 64-hex digit key. A daemon may run on the central cloud server to generate a new key at a configurable interval, which may be hours or days. The central cloud server may maintain a copy of the key.

In operation, the daemon may first check for connectivity to the target wireless access station. If there is no connectivity to the target wireless access station, the daemon may exit. If connectivity is present, the daemon may generate a new key and then may send it to the target wireless access station, in some embodiments over a secure encrypted link. The daemon then awaits a response. If no response is received, the central cloud server may not update its copy of the key. Thus, a handshake may be used between the wireless access station and the cloud coordination server to ensure that the cloud coordination server is aware each time the wireless access station's locally-stored credentials are updated.

If a response is received, the central cloud server may update its copy of the key. The target wireless access station may disable the AP network and may re-enable the network with the new key. A technician wishing to access the target wireless access station may request the key from the central cloud server, and using the key, connect to the AP at the wireless access station.

Station Mode

In some embodiments, a wireless access station may instead scan for a wireless network with a given SSID, without itself creating the network, thus remaining in STA (station) mode and not in AP mode, so that there is nothing on the air unless a suitable AP is in the vicinity and is required.

In some embodiments, the DebugSSID process could be started at startup time (before RAN application software), and if does not hear from the application it programs the radio is the desired mode based on the approach selected. In some embodiments, the DebugSSID process could be started by the sysmgr, assuming that sysmgr comes up. In some embodiments, the DebugSSID may be promoted to its own session, even if started from the sysmgr. In some embodiments, the DebugSSID may be run as an independent process (not a thread). In some embodiments, the DebugSSID process may always be running in dormant mode, and if does not get cloud-reachability audit responses from the application software, it should start active operation.

In some embodiments, a wireless configuration network is provided by causing the wireless access station to automatically connect to a hotspot with a particular SSID. The wireless access station may connect in STA mode, instead of in AP mode, and the mobile configuration device may create the network in AP mode. A STA mode software module may be enabled to periodically poll nearby wireless APs to find a nearby technician device in AP mode with the requisite SSID.

Once a connection to a wireless configuration network is made, additional security precautions may be provided. For example, a limited command line interface may be provided in place of a system-level shell environment. As another example, a secure network protocol connection may be required between the mobile configuration device (e.g., tablet computer) and the eNodeB or base station.

In some embodiments, a debug device or mobile configuration device may be specially configured to support an AP mode (e.g., to create a wireless network with a particular SSID) to permit the wireless access station to connect to it. In some embodiments, the AP may use the frequency of operation of the RAN radio. Scans may be restricted to a particular frequency, in some embodiments. In some embodiments, a separate radio may be used at the AP or at the STA. In some embodiments, the STA may only create the wireless configuration network when backhaul operation is unavailable.

It is possible to run in STA mode on the same radio which is running multiple VAPs, in some embodiments. In other embodiments the STA mode module may use a dedicated physical interface.

Security

In some embodiments, layer 2 security may be provided, including peer-to-peer authentication (cert/PSK etc.).

In some embodiments, even if the credentials are PSK based, they can be updated from the default after the first time cloud connectivity is established.

In some embodiments, enterprise-class security, including layer 2 security may be provided, particularly with the STA mode, up to and including a central RADIUS server. In some embodiments, PSK/SAE or peer-to-peer certificate validation are provided. In some embodiments, secure shell (SSH) is provided, and only specified ports may be left open, with no wild card IP address-based listeners in the system. If a mechanism less secure than certificates is used, a way to update the credentials may be provided. In some embodiments, security credentials may be persisted in a data store or a file. In some embodiments, an additional layer of security is provided in some embodiments by requiring a secure shell (SSH) session. In some embodiments, when always active, access may be controlled to the ssh port based on criteria used to bring the service active.

In some embodiments, limited privileges may be available once a user is logged in, via, for example, a chroot jail or equivalent limited shell. A local cache of faults and alarms may be made available to this limited-privileges debug user. In other embodiments, full control may be available. For example, a full shell may be made available.

Functions Enabled

In some embodiments, one of more of the following functions may be supported: a command-line interface (CLI) via telnet or secure shell (SSH), a chroot jail, review of log files, archiving of log files, configuration of hardware installed at the wireless access station.

In some embodiments, static addressing may be used, including an arbitrary static subnet or link-local addressing. In other embodiments, a DHCP server may be provided for dynamic addressing.

In some embodiments, one or more of the following functions may also be supported: access to self-organizing network (SON) global positioning system (GPS) data, neighbor lists, information about neighbors, including signal strength and quality of neighbors, radio resource management (RRM) status, mesh status, bachkhaul status, backhaul signal strength, including RSSI.

In some embodiments, a file transfer protocol, such as TFTP/FTP/SFTP/SCP, may be enabled. In some embodiments, IP addresses of configurable hosts, addresses of core network nodes, or other addresses may be configured. Installation of certificates may be enabled, in some embodiments. In some embodiments, resetting the wireless access station to factory defaults may be enabled.

In some embodiments, a firmware or software upgrade may be enabled.

In some embodiments, the wireless configuration network may permit configuration via a web browser accessed from a node on the wireless configuration network using a web server located at the wireless access station and executable programs running on the web server. Access may be limited only to nodes on the wireless configuration network, in some embodiments.

In some embodiments, the following functions may be enabled: meshAdvertisedRouteData; meshDynRouteData; meshInterfaceStats; meshNeighborData; meshNeighborStats; meshNodeStatus; monitorSysLog (all text logged into wireless access station's log file after this API is called will be monitored); resetLogLevels (results in setting all log levels to wireless access station's default logging level); resetMonitorSysLog (to stop monitoring syslog); rrmStatus; sonGpsData (providing one or more of a latitude, a longitude, an azimuth, and a trigger distance); sonLteCellInfo (providing a physical cell ID (PCI), cellID, TxPower); sonLteCellNeighborList (with a list of neighbors and a count of neighbors, where the neighbors may include a wireless access stationID, slotId, pci, cellId, tac, and also other parameters, such as eNBID, slotId, pci, cellId, tac); sysAlarms (with a list of alarms and including parameters such as a process, whether a task was restarted, severity, the task affected, whether an update failed, whether service was affected, whether connectivity was lost, or other status); sysConfigIni (providing a text file output of a system initialization file); sysGpsData (providing one or more of a latitude, a longitude, an azimuth, and a trigger distance); sysInventory (including identification details of one or more hardware parts located at the wireless access station, and potentially including part numbers, serial numbers, revision numbers, software numbers, descriptions, or other parameters); sysLog (providing text file output, which may default to returning the contents of a file at /var/log/messages); sysLogFiles (describing the log files on the system, including their length, filename, file path, applications logged, parameters retained in the log, log levels, default log levels, and other parameters); sysLogLevelSet (to set the system log level); sysReboot (to reboot the wireless access station); sysStatus (including information about all configured IP hosts and whether connectivity to the cloud is available); sysTaskInfo (including process information about all tasks on the system, including all output commonly provided by a computer system for identifying a process, including ports and network resources used, and specifically including network processes such as a dynamic host configuration protocol (DHCP) manager, a DHCP client, a SON manager, a SON client, and other network processes); sysVersion (providing text file output of system version); WiFiGetBhRssi; WiFiGetBhStats; or other parameters.

In some embodiments, a device UDID may be required to be located in an access control list on the wireless access station.

In some embodiments, an initial configuration wizard may be supported, either from a command line or from a graphical user interface, which may be delivered through a web application and web browser.

In some embodiments, a protocol such as Javascript Object Notation (JSON) or another text-based or binary protocol may be used to send arbitrary configuration blobs over the secure wireless connection to cause the wireless access station to be reconfigured.

In some embodiments, cloud control of the wireless configuration network may be provided, including cloud activation and deactivation of the network using a command line interface at a cloud coordination server.

In some embodiments, a security key may be provided, such as a Wi-Fi Protected Access Pre-Shared Key (PSK). The PSK may be updated from the cloud, in some embodiments.

To deactivate or disable the wireless configuration network: a) the cloud may send command to disable the feature to platform manager; b) the platform manager send SIGTERM/SIGKILL to daemon; c) the signal handler for debugAP may be overwritten so that cleanup process can be complete; d) the wireless configuration network may stop hostapd and remove the virtual interface; and e) the platform manager may start debugssid feature.

To activate or enable the wireless configuration network from the cloud: a) the cloud may send command to enable or disable the feature to platform manager; b) the platform manager send SIGTERM/SIGKILL to debugssid daemon; c) the signal handler for debugssid may be overwritten so that cleanup process can be completed; d) the debugssid may stop wpa_supplicant, dhcp client and remove the virtual interface (if created); and e) the platform manager may start debugAP feature.

In some embodiments, an out-of-band channel may be used, such as a short message service (SMS) channel, to provide any security information to a wireless client device.

A wireless access station could be functioning in either one of two possible modes of operation: gateway mode and mesh mode. A gateway mode has access to an inter-connect network though which it establishes connectivity to the cloud. The inter-connection could either be wired or wireless (e.g. LTE). In mesh mode, the wireless access station has no direct connection to the core or infrastructure provider network. Its only means of connecting to the network is over mesh links. Establishment of the mesh network is covered in other applications, such as U.S. application Ser. No. 14/146, 857, hereby incorporated in its entirety.

FIG. 1 depicts a deployment scenario for a wireless access station in an operator network, in accordance with some embodiments. Base stations 104, 105, 106, 109, 110, 111 provide access to UEs 103, 107, 108, 112, 113 to core network 102. Also shown is coordinating node 101, which may be in communication with one or more base stations, and in some embodiments may act as a gateway to core network 102 (not shown). UEs 103, 108 are Wi-Fi UEs and are using Wi-Fi access networks from base stations 104, 109. UEs 107, 112, 113 are LTE UEs and are using LTE access networks from base stations (i.e., eNodeBs) 110, 111, 106. Base stations 104 and 106 have backhaul connections to coordinating node 101 and core network 102. These backhaul connections may be hard-wired, or dedicated wireless links, including LTE backhaul links, in some embodiments. All other base stations 105, 109, 110, 111 are connected via mesh backhaul, which may be Wi-Fi mesh backhaul, to either base station 104, 106, or both (in the case of base station 105). Base stations 104, 105, 106, 109, 110, 111 are multi-RAT base stations and have Wi-Fi capabilities. In some embodiments, the depicted network may be a 3-radio setup using 3 channels, namely, either 1xLTE and 2xWi-Fi, with one Wi-Fi channel for backhaul, or 2xLTE and 1xWi-Fi, with one LTE channel for backhaul.

In operation, nodes 104 and 106 may be in gateway mode and may be providing mesh connectivity to core network 102 to base stations 105, 109, 110, and 111. The nodes may be brought up in any particular order, and once one or more backhaul connections via nodes 104 and 106 are brought up, the nodes are all able to reconfigure their mesh connectivity to connect to the gateway nodes and connect to core network 102. Configuration may be performed by preconfiguration of each node, or by causing each node to connect to coordinating node 101 and download configuration, or some combination of these, or another method, in some embodiments.

Each of the nodes has the capability to start a wireless configuration network. When a node detects that it is in an anomalous configuration state, it may activate the wireless configuration network, in some embodiments. Alternately, the wireless configuration network may be brought up at startup for each node, in some embodiments. The wireless configuration network can be configured with a limited range, since only a technician or other authorized user nearby the node is intended to connect to it. In some embodiments, UEs 103, 108, 107, 112 may be unable to connect with a node's wireless configuration network without being on a UE/MAC address/IMSI whitelist.

Figure 2:
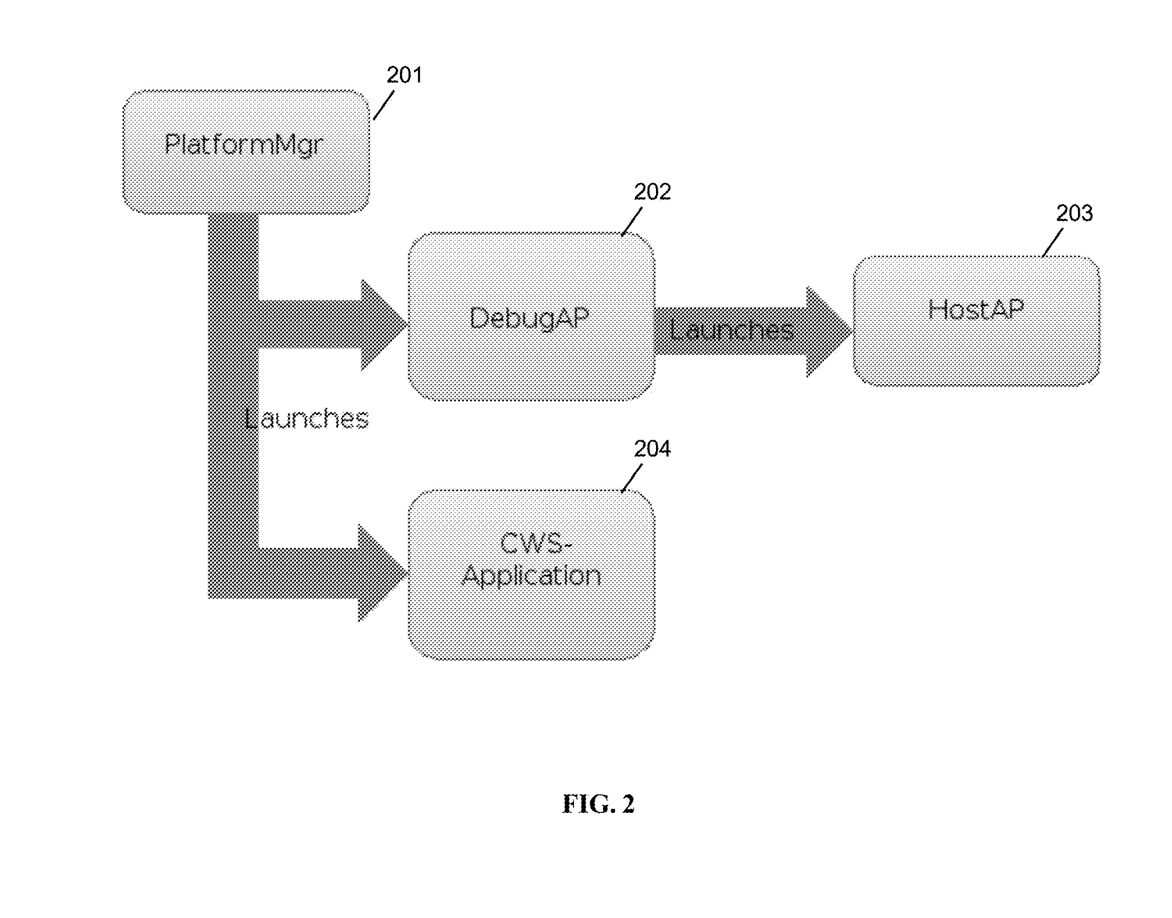
FIG. 2 depicts a process tree for a wireless access station in an operator network, in accordance with some embodiments.

FIG. 2 depicts a process tree for a wireless access station in an operator network, in accordance with some embodiments. At node startup on a wireless access station, process Platform Manager 201 is activated, which in turn activates other processes that provide necessary functions on each node. In some embodiments, platform manager 201 first starts debug access point process 202, which then asynchronously launches a host access point module 203. Debug access point process 202 may provide general debug access point configuration and process management, including exchange of configuration information and security information with a coordinating node or security server in the network, in some embodiments. Host access point module 203 may create an access point for providing a wireless configuration network. In some embodiments, another station mode module (not shown) may be used to scan for a specially-identified access network in STA mode, as described elsewhere herein.

Platform manager 201 then starts other node processes 204, here labeled "CWS-Application," such as a mesh process, a wireless access process, or another process. In some embodiments, DebugAP 202 and HostAP 203 are separate processes from the processes that handle wireless access and backhaul, and communicate via modification of configuration files and/or system interapplication communication methods. In isolating processes 202 and 203 from application process 204, the debug access point is able to persist even if a fault brings down application process 204.

Figure 3:
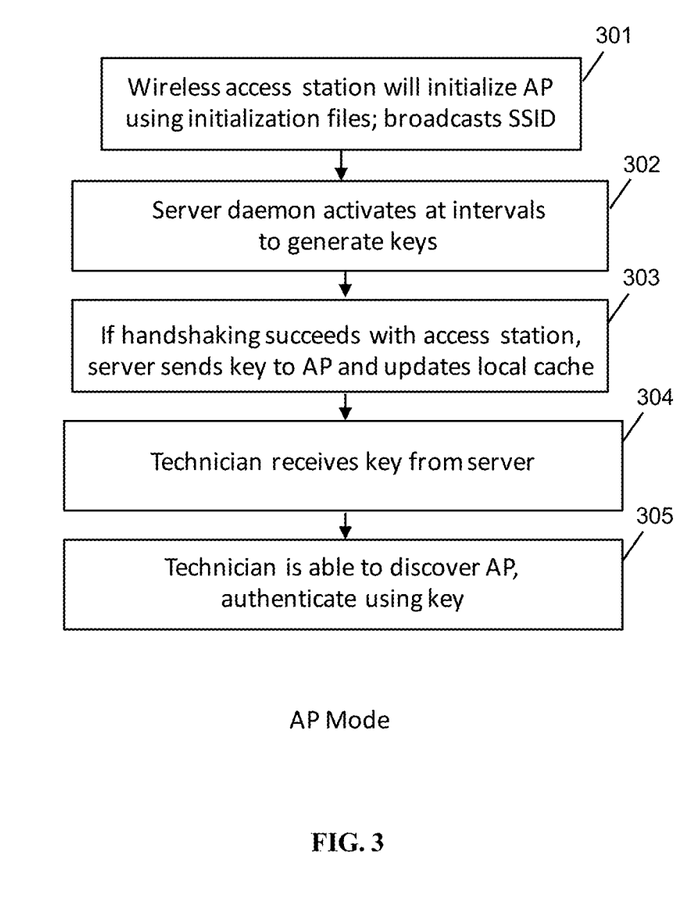
FIG. 3 is a flowchart of a debug network in access point mode, in accordance with some embodiments.

FIG. 3 is a flowchart of a debug network in access point mode, in accordance with some embodiments. At step 301, a wireless access station may initialize a configuration access point. The configuration access point may be preconfigured using configuration files on local storage, in some embodiments. In some embodiments, when connectivity to a configuration server is available, these configuration files may be regularly updated from the configuration server according to a schedule. In the AP mode described with relation to FIG. 3, the wireless access station may broadcast a network, and may permit devices to connect to it. The SSID may be hidden, in some embodiments, or it may be public, in some embodiments. Authentication may be required, in many environments and embodiments. As shown in FIG. 3, the SSID is broadcast.

At step 302, a server daemon activates at intervals to generate keys. The keys are security keys for use in authenticating a technician's device. The keys may be passwords, IKE keys, EAP keys, or any other security information. The server daemon may be located at a server, such as at a coordinating node, either in the core network, or on the Internet, or elsewhere. The server daemon may activate at a configurable interval. The server daemon may generate or regenerate keys or other security information at intervals and send the new keys to the wireless access station, in order to make it more difficult for an attacker to access the configuration network.

At step 303, a handshaking step is used between the server and the wireless access station before transferring key information. If a technician is making configuration changes to a system, the technician may be taking the wireless access station off the network. Accordingly, it is not helpful if the technician's wireless device has a security key that is more recently generated than the security key on the wireless access station. Therefore, the handshaking step allows the server to maintain an accurate record of what security keys are on the wireless access station, even in an environment where the wireless access station may lose connectivity to the core network. Once handshaking is complete, the security key has been transmitted to the wireless access station and stored in a local cache at the wireless access station.

At step 304, following handshaking, the server can then inform the technician's mobile device what security key to use. At step 304, the technician is able to take his mobile device to a location in close proximity to the wireless access station, discover the configuration network using the broadcast SSID (or connect to a predetermined private SSID), and connect to the configuration network on the wireless access station using the security key.

Figure 4:
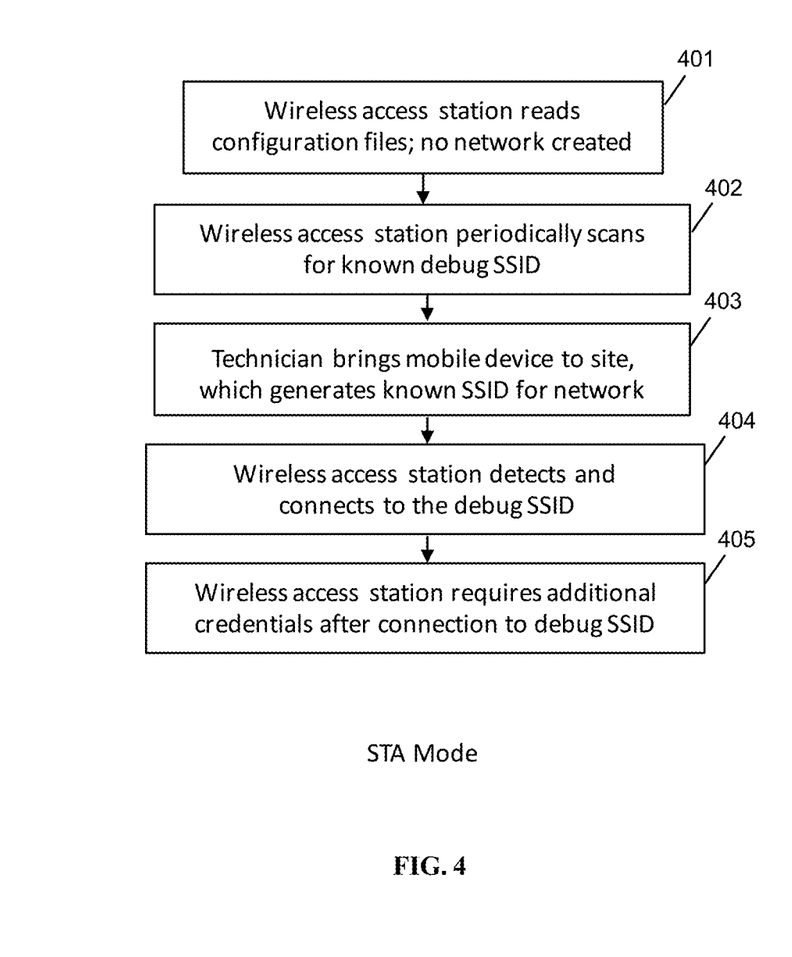
FIG. 4 is a flowchart of a debug network in station mode, in accordance with some embodiments.

FIG. 4 is a flowchart of a debug network in station mode, in accordance with some embodiments. At step 401, the wireless access station initializes the access point using one or more configuration files. However, in the STA mode described here, no network is created. Instead, the access station is configured to search for a particular SSID. In some embodiments the SSID can change over time, and may be determined using an internal algorithm, or via synchronization with a configuration server.

At step 402, the wireless access station may periodically scan for the known debug SSID. This may include scanning at a predetermined interval, a random interval, or based on the input of a radio scanner or sniffer. Since the wireless access station is scanning for the technician's debug SSID, instead of creating a security risk by exposing the existence and name of a debug network generated by the wireless access station, the wireless access station is able to make it more difficult for potential attackers to discover and access the configuration network.

At step 403, when a technician comes to the site with a configured mobile device, he or she activates the debug network. At step 404, the debug network is detected and the wireless access station connects to it in wireless STA mode, e.g., the wireless access station connects to the technician's device as a client. In some embodiments, a dynamic host configuration protocol (DHCP) server may be provided to assign an IP address, the DHCP server being located either at the wireless access station or at the technician's device. At step 405, the wireless access station may require additional credentials after connecting to the debug network. In some embodiments, the additional credentials may be Wi-Fi security credentials. In some embodiments, the additional credentials may include application layer security information. For example, a technician may still need to set up a virtual private network (VPN) or secure shell (SSH) connection with the wireless access station to perform configuration tasks, even after the two devices are on the same network.

Figure 5:
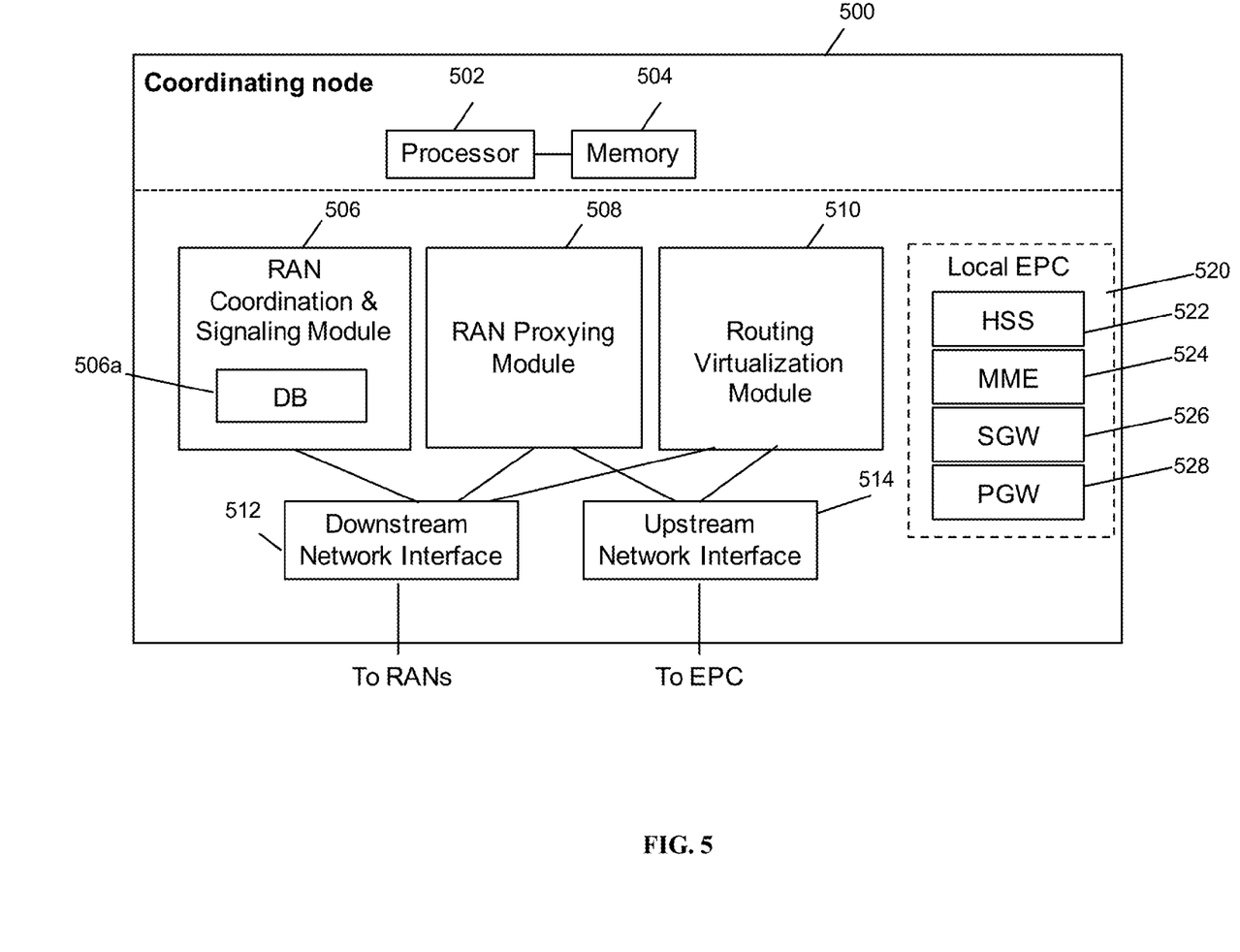
FIG. 5 is a block diagram of a coordinating node, in accordance with some embodiments.

FIG. 5 is a block diagram of a coordinating node, in accordance with some embodiments. Coordinating node 500 includes processor 502 and memory 504, which are configured to provide the functions described herein. Also present are radio access network coordination/signaling (RAN Coordination and signaling) module 506, RAN proxying module 508, and routing virtualization module 510.

RAN coordination module 506 may include database 506a, which may store associated debug access keys and security information for each RAN, as described herein. In some embodiments, gateway 500 may coordinate multiple RANs using coordination module 506. If multiple RANs are coordinated, database 506a may include information for debug networks on each of the multiple RANs.

In some embodiments, coordination server may also provide proxying, routing virtualization and RAN virtualization, via modules 510 and 508. In some embodiments, a downstream network interface 512 is provided for interfacing with the RANs, which may be a radio interface (e.g., LTE), and an upstream network interface 514 is provided for interfacing with the core network, which may be either a radio interface (e.g., LTE) or a wired interface (e.g., Ethernet). Signaling storm reduction functions may be performed in module 506.

Coordinating node 500 includes local evolved packet core (EPC) module 520, for authenticating users, storing and caching priority profile information, and performing other EPC-dependent functions when no backhaul link is available. Local EPC 520 may include local HSS 522, local MME 524, local SGW 526, and local PGW 528, as well as other modules. Local EPC 520 may incorporate these modules as software modules, processes, or containers. Local EPC 520 may alternatively incorporate these modules as a small number of monolithic software processes. Modules 506, 508, 510 and local EPC 520 may each run on processor 502 or on another processor, or may be located within another device.

Figure 6:
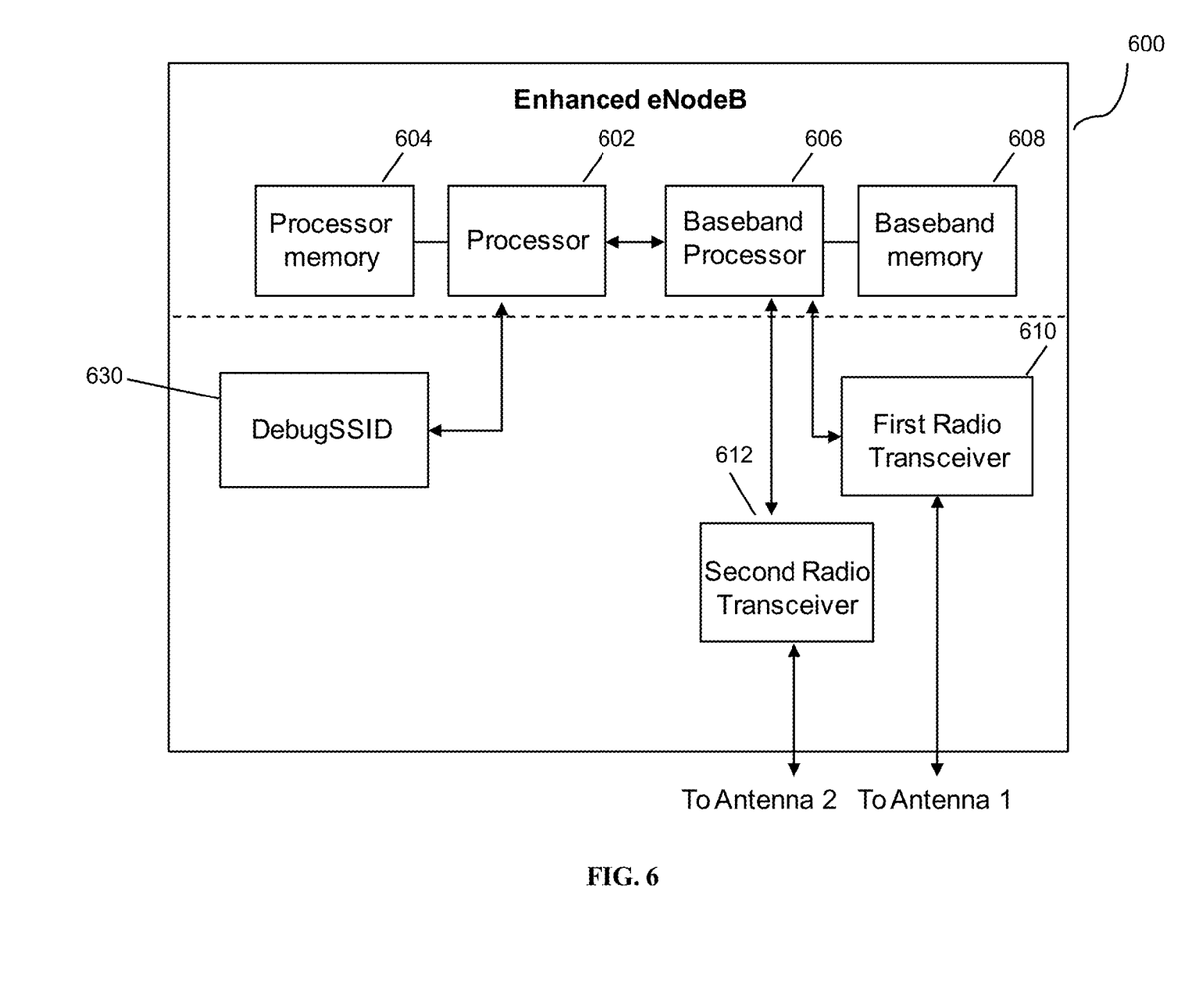
FIG. 6 is a block diagram of an enhanced eNodeB, in accordance with some embodiments.

FIG. 6 is a block diagram of an enhanced eNodeB, in accordance with some embodiments. Enhanced eNodeB 600 may include processor 602, processor memory 604 in communication with the processor, baseband processor 606, and baseband processor memory 608 in communication with the baseband processor. Enhanced eNodeB 600 may also include first radio transceiver 610 and second radio transceiver 612, internal universal serial bus (USB) port 616, and subscriber information module card (SIM card) 618 coupled to USB port 614. In some embodiments, the second radio transceiver 612 itself may be coupled to USB port 616, and communications from the baseband processor may be passed through USB port 616.

Processor 602 and baseband processor 606 are in communication with one another. Processor 602 may perform routing functions, and may determine if/when a switch in network configuration is needed. Baseband processor 606 may generate and receive radio signals for both radio transceivers 610 and 612, based on instructions from processor 602. In some embodiments, processors 602 and 606 may be on the same physical logic board. In other embodiments, they may be on separate logic boards.

The first radio transceiver 610 may be a radio transceiver capable of providing LTE eNodeB functionality, and may be capable of higher power and multi-channel OFDMA. The second radio transceiver 612 may be a radio transceiver capable of providing Wi-Fi capability, including 2.4 GHz, 5 GHz, 802.11a/b/g/f/ac/ah or other Wi-Fi capabilities. Second radio transceiver 612 may be used for mesh network or backhaul purposes, in some embodiments, and may be configured to connect to other Wi-Fi access points or mesh nodes. Both transceivers 610 and 612 are capable of receiving and transmitting on one or more bands. Transceiver 610 may be coupled to processor 602 via a Peripheral Component Interconnect-Express (PCI-E) bus, and/or via a daughtercard. Additional transceivers may be part of eNodeB 600, including transceivers for providing LTE UE functionality, with attached SIM card or software SIM card (not shown).

Debug network module 630 may also be included, providing functionality as described above with respect to starting a debug network, connecting to a debug network, monitoring a debug network, scanning for a debug network, or performing other functions as described hereinabove. Debug network module 630 may connect to first radio transceiver 610 to use the same Wi-Fi antenna and signal chain to either access a network in STA mode or broadcast access to a network in AP mode.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 610 and 612, which may be Wi-Fi 502.11a/b/g/n/ac/ad/ah, Bluetooth, ZigBee, microwave (including line-of-sight microwave), or another wireless backhaul connection. Any of the wired and wireless connections may be used for either access or backhaul, according to identified network conditions and needs, and may be under the control of processor 602 for reconfiguration.

Other elements and/or modules may also be included, such as a home eNodeB, a local gateway (LGW), or another module. Additional radio amplifiers, radio transceivers and/or wired network connections may also be included.

Processor 602 may identify the appropriate network configuration, and may perform routing of packets from one network interface to another accordingly. Processor 602 may use memory 604, in particular to store a routing table to be used for routing packets. Baseband processor 606 may perform operations to generate the radio frequency signals for transmission or retransmission by both transceivers 610 and 612. Baseband processor 606 may also perform operations to decode signals received by transceivers 610 and 612. Baseband processor 606 may use memory 608 to perform these tasks.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, other 3G/2G, legacy TDD, or other air interfaces used for mobile telephony. In some embodiments, the base stations described herein may support Wi-Fi air interfaces, which may include one or more of IEEE 502.11a/b/g/n/ac. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces. In some embodiments, the base stations described herein may use programmable frequency filters. In some embodiments, the base stations described herein may provide access to land mobile radio (LMR)-associated radio frequency bands. In some embodiments, the base stations described herein may also support more than one of the above radio frequency protocols, and may also support transmit power adjustments for some or all of the radio frequency protocols supported. The embodiments disclosed herein can be used with a variety of protocols so long as there are contiguous frequency bands/channels. Although the method described assumes a single-in, single-output (SISO) system, the techniques described can also be extended to multiple-in, multiple-out (MIMO) systems. Wherever IMSI or IMEI are mentioned, other hardware, software, user or group identifiers, can be used in conjunction with the techniques described herein.

Those skilled in the art will recognize that multiple hardware and software configurations could be used depending upon the access protocol, backhaul protocol, duplexing scheme, or operating frequency band by adding or replacing daughtercards to the dynamic multi-RAT node. Presently, there are radio cards that can be used for the varying radio parameters. Different securithe multi-RAT nodes of the present invention could be designed to contain as many radio cards as desired given the radio parameters of heterogeneous mesh networks within which the multi-RAT node is likely to operate. Those of skill in the art will recognize that, to the extent an off-the shelf radio card is not available to accomplish transmission/reception in a particular radio parameter, a radio card capable of performing, e.g., in white space frequencies, would not be difficult to design.

Those of skill in the art will also recognize that hardware may embody software, software may be stored in hardware as firmware, and various modules and/or functions may be performed or provided either as hardware or software depending on the specific needs of a particular embodiment.

In the present disclosure, the words location and position may be used in various instances to have the same meaning, as is common in the relevant art.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, in various orders as necessary.

Although the above systems and methods for providing interference mitigation are described in reference to the Long Term Evolution (LTE) standard, one of skill in the art would understand that these systems and methods could be adapted for use with other wireless standards or versions thereof. For example, certain methods involving the use of a virtual cell ID are understood to require UEs supporting 3GPP Release 11, whereas other methods and aspects do not require 3GPP Release 11.

In some embodiments, the software needed for implementing the methods and procedures described herein may be implemented in a high level procedural or an object-oriented language such as C, C++, C#, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment. Other embodiments are within the following claims. For example, another version of the 802.11 Wi-Fi specification may be used, or features listed above with reference to the access point mode may also be used with the station mode, and vice versa.

The invention claimed is:

1. A method for enabling configuration at a base station, comprising:
   reading configuration information for a configuration wireless network at a cellular base station with Wi-Fi capability, the configuration information including a known Wi-Fi service set identifier (SSID);
   synchronizing the configuration information with a coordination server;
   periodically scanning for the known Wi-Fi SSID in a non-access point (AP) mode;

connecting to the known Wi-Fi SSID generated by another device acting as an access point (AP), the another device receiving the known Wi-Fi SSID from the coordination server;

establishing a secure network protocol connection between the base station and the another device for performing operational configuration of the base station;

requiring additional security credentials after the cellular base station connects to the configuration wireless network; and using a current version of the configuration information and permitting a cellular device to attach to the cellular base station at a particular time when the cellular base station does not have a backhaul connection to a core network.

2. The method of claim 1, wherein the configuration information includes a Wi-Fi pre-shared key (PSK).

3. The method of claim 1, further comprising providing health monitoring, connectivity checking, hardware status monitoring, network status monitoring, load monitoring, or other status monitoring at the base station.

4. The method of claim 1, further comprising whitelisting certain devices for enabling the mobile device to connect to the configuration wireless network, the whitelisting using an identifier from the mobile device, the identifier being international mobile subscriber identity (IMSI), international mobile equipment identity (IMEI), medium access control (MAC) address, mobile subscription identification number (MSIN), globally unique temporary user equipment identity (GUTI), device serial number, or device configuration number.

\* \* \* \* \*